United States Patent
Hiratsuka et al.

(10) Patent No.: US 12,349,088 B2
(45) Date of Patent: Jul. 1, 2025

(54) COMMUNICATION DEVICE

(71) Applicant: NTT DOCOMO, INC., Tokyo (JP)

(72) Inventors: Daisuke Hiratsuka, Tokyo (JP); Kunihiko Teshima, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 524 days.

(21) Appl. No.: 17/755,771

(22) PCT Filed: Nov. 7, 2019

(86) PCT No.: PCT/JP2019/043692
§ 371 (c)(1),
(2) Date: May 6, 2022

(87) PCT Pub. No.: WO2021/090444
PCT Pub. Date: May 14, 2021

(65) Prior Publication Data
US 2022/0408390 A1    Dec. 22, 2022

(51) Int. Cl.
  *H04W 56/00*    (2009.01)
  *H04W 88/08*    (2009.01)
(52) U.S. Cl.
  CPC ........ *H04W 56/0015* (2013.01); *H04W 88/08* (2013.01)
(58) Field of Classification Search
  USPC ....... 370/229, 236, 241, 246, 252, 315, 328, 370/329, 516
  See application file for complete search history.

(56) References Cited

U.S. PATENT DOCUMENTS

| | | | |
|---|---|---|---|
| 2005/0025194 A1* | 2/2005 | Adjakple | H04W 56/0015 370/345 |
| 2008/0045145 A1* | 2/2008 | Nakatsugawa | H04B 7/155 455/11.1 |
| 2008/0108355 A1* | 5/2008 | Oleszcsuk | H04W 72/1263 455/442 |
| 2009/0116420 A1* | 5/2009 | Jeong | H04W 56/0005 370/312 |
| 2015/0189610 A1* | 7/2015 | Siomina | H04L 5/14 370/280 |
| 2018/0198539 A1* | 7/2018 | Kim | H04B 17/336 |

(Continued)

FOREIGN PATENT DOCUMENTS

| CN | 101170357 B | 6/2010 |
|---|---|---|
| CN | 102546344 B | 12/2017 |
| JP | 2019012937 A | 1/2019 |

OTHER PUBLICATIONS

Office Action issued in counterpart Chinese Application No. 201980101871.3, mailed Feb. 29, 2024 (24 pages).

(Continued)

*Primary Examiner* — Nguyen H Ngo
(74) *Attorney, Agent, or Firm* — Osha Bergman Watanabe & Burton LLP

(57) ABSTRACT

An O-RAN distributed unit (O-DU) receives, from an intermediate device provided on a fronthaul, processing time information indicating a processing time in the intermediate device. The O-DU decides capability information set for the intermediate device based on at least the processing time information and transmits the decided capability information to the intermediate device.

6 Claims, 11 Drawing Sheets

(56) References Cited

U.S. PATENT DOCUMENTS

2019/0053301 A1\* 2/2019 Hampel ............... H04W 84/04
2019/0313288 A1 10/2019 Li et al.

OTHER PUBLICATIONS

Umesh et al. "Outline of RAN front hole specifications" NTT Docomo Technical Journal, vol. 27, No. 1; Apr. 2019 (26 pages).
"ORAN-WG4.CUS.0-v02.00", O-RAN Fronthaul Working Group, Control, User and Synchronization Plane Specification, O-RAN Alliance, Aug. 2019 (218 pages).
International Search Report issued in International Application No. PCT/JP2019/043692, mailed Jun. 30, 2020 (5 pages).
Written Opinion issued in International Application No. PCT/JP2019/043692; Dated June 30, 2020 (3 pages).
Office Action filed in the counterpart Chinese Application No. 201980101871.3 mailed Aug. 28, 2023 (23 pages).
Extended European Search Report issued in European Application No. 19951365.6, mailed on Jun. 14, 2023 (11 pages).

\* cited by examiner

COMMUNICATION DEVICE

TECHNICAL FIELD

The present invention relates to a communication device compatible with a fronthaul interface.

BACKGROUND ART

The O-RAN Alliance was established for the purpose of facilitating openness and intelligence of the radio access network (RAN) in the 5G era, and today many operators/vendors have joined and made the discussions.

A plurality of architectures have been discussed in the O-RAN, and as one of the architectures an open fronthaul (FH) interface has been discussed which realizes interconnection of a baseband processing unit and a radio unit between different vendors.

Specifically, in the O-RAN, an O-RAN distributed unit (O-DU) and an O-RAN radio unit (O-RU) are defined as a function group for performing layer 2 functions, baseband signal processing, and radio signal processing and are discussed as an interface between the O-DU and the O-RU.

In the O-RAN, strict timing accuracy is required because the function sharing points of the O-DU and the O-RU are placed in the physical (PHY) layer. For this reason/delay management of the FH is performed, and a transmission window and a reception window are used as the method (Non Patent Literature 1).

In addition, the current O-RAN FH specifications presuppose a station placement method in which one cell is configured with one 0-RU. On the other hand, there is also a station placement method in which one cell is configured with a plurality of O-RUs, and expansion of the specifications for the configuration has been considered. Specifically, a configuration (FHM configurations using a device (FHM: Fronthaul Multiplexing) for bundling O-RUs and a configuration (cascade configuration) in which the O-RUs are continuously connected have been considered. These configurations are collectively called a Shared Cell. In addition, in the following description, the FHM and the O-RU (cascade O-RU) interposed in the middle are collectively referred to as an intermediate device (tentative name).

CITATION LIST

Non Patent Literature

Non Patent Literature 1: "ORAN-WG4.CUS.0-v02.00", O-RAN Fronthaul Working Group, Control, User and Synchronization Plane Specification, O-RAN Alliance, August 2019

SUMMARY OF INVENTION

However, the configuration of the Shared Cell as described above has the following problems. Specifically, since the FH delay is changed between the O-DU and the intermediate device, between the intermediate device and the intermediate device, and between the intermediate device and the O-RU, the appropriate size of the transmission window of the intermediate device depends on the station placement (fixing position) of the intermediate device.

Further, the intermediate device needs to wait for the signal of the pre-stage device because the intermediate device combines the signal of the pre-stage device (for example, the O-RU) in the uplink (UL). However, as described above, since the FH delay is changed between the O-DU and the intermediate device, between the intermediate device and the intermediate device, and between the intermediate device and the O-RU according to the station placement of the intermediate device, the required waiting time depends on the station placement.

For this reason, there occur a problem that all the signals from the pre-stage device cannot be received due to short waiting time of the intermediate device or a signal cannot be transmitted in time for the reception window of the post-stage device due to too long waiting time, and as a result, there is a possibility that the transmission and the reception of the FH signals may not be performed correctly.

Therefore, the present invention has been made in view of such a situation, and the present invention is to provide a communication device capable of correctly transmitting and receiving the FH signal even in a case where the shared cell configuration in the fronthaul (FH) interface is applied.

According to one aspect of the present disclosure, there is provided a communication device (O-DU 110) including: a receiving unit (processing time acquisition unit 113) which receives, from an intermediate device (intermediate device 130) provided on a fronthaul, processing time information indicating a processing time in the intermediate device; a control unit (parameter control unit 115) which decides capability information set for the intermediate device based on at least the processing time information; and a transmitting unit (parameter notification unit 117) which transmits the capability information to the intermediate device.

BRIEF DESCRIPTION OF DRAWINGS

FIG. 33 is a diagram illustrating a configuration example of a fronthaul (with intermediate device, FHM configuration).

DESCRIPTION OF EMBODIMENTS

Figure 1:
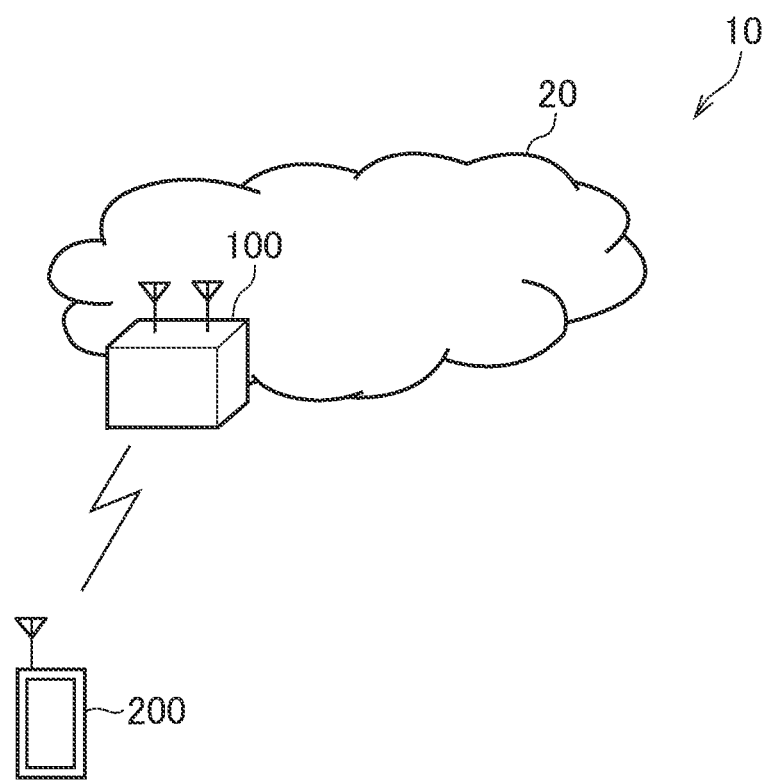
FIG. 1 is an overall schematic configuration diagram of a radio communication system 10.

Hereinafter, embodiments will be described with reference to the drawings. Note that the same functions and configurations are denoted by the same or similar reference numerals, and description thereof will be omitted as appropriate.

(1) Overall Schematic Configuration of Wireless Communication System

FIG. 1 is an overall schematic configuration diagram of a radio communication system 10 according to the present embodiment. In the present embodiment, the radio communication system 10 is a radio communication system according to 5G New Radio (NR) and includes a next generation-radio access network 20 (hereinafter, NG-RAN 20) and a terminal 200 (user equipment 200, hereinafter, UE 200).

The NG-RAN 20 includes a radio base station 100 (hereinafter, gNB 100). Note that the specific configuration of the radio communication system 10 including the numbers of gNBs and UEs is not limited to the example illustrated in FIG. 1.

The NG-RAN 20 actually includes a plurality of NG-RAN Nodes, specifically, gNB (or ng-eNB) and is connected to a core network (5GC, not illustrated) compliant to 5G. Note that the NG-RAN 20 and 5GC may be simply expressed as a network.

The gNB 100 is a radio base station compliant to 5G and executes radio communication with the UE 200 compliant to 5G. The gNB 100 and The UE 200 can be compatible with Massive MIMO which generates a more directional beam by controlling radio signals transmitted from a plurality of antenna elements, carrier aggregation (CA) using a bundle of a plurality of component carriers (CC), dual connectivity (DC) in which simultaneous communication is performed between the UE and each of the plurality of NG-RAN nodes, and the like.

In addition, in the present embodiment, the gNB 100 employs a fronthaul (FH) interface defined by the O-RAN.

(2) Configuration of Fronthaul

Figure 2:
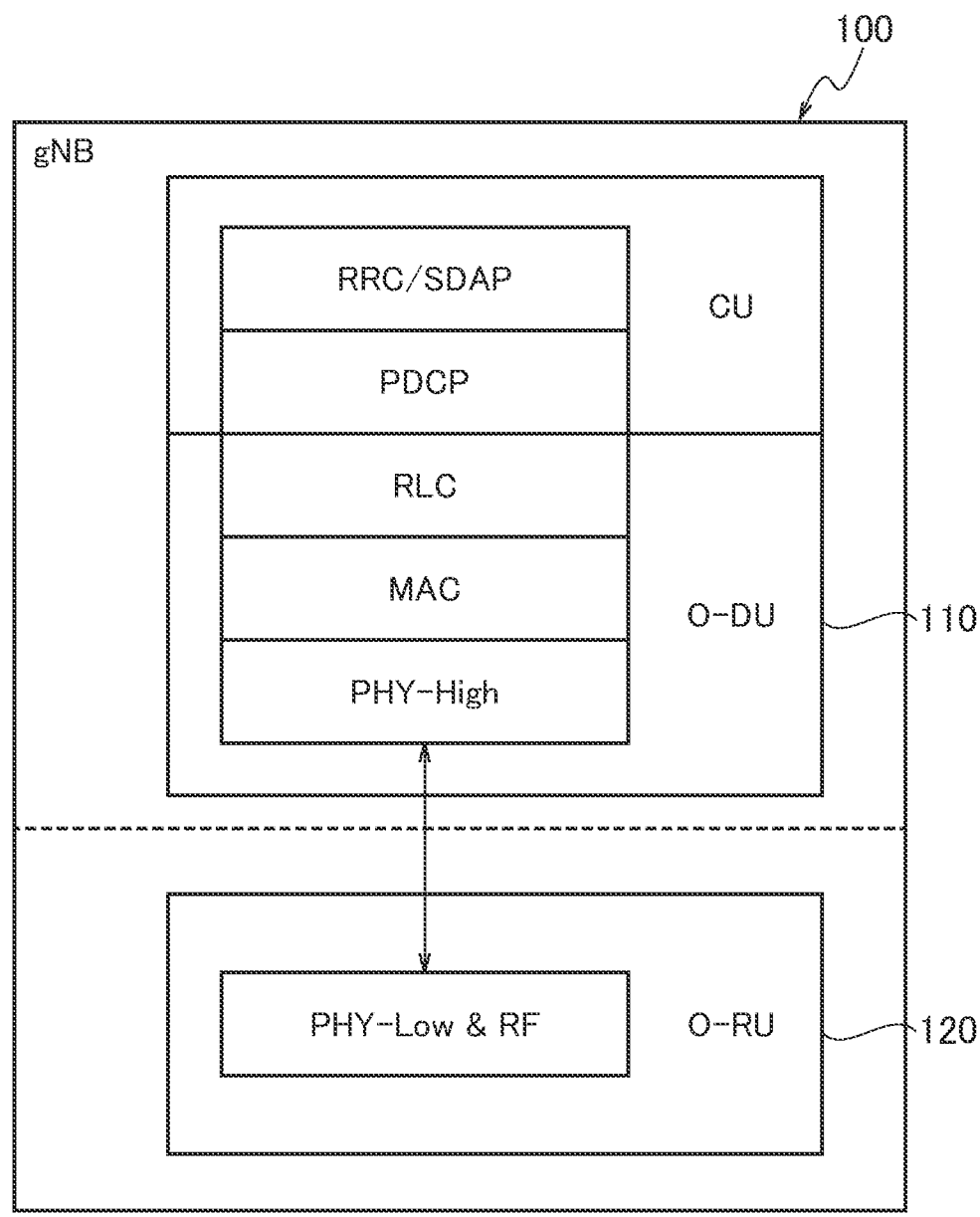
FIG. 2 is a diagram illustrating an internal configuration example of a gNB 100 that employs a fronthaul (FH) interface.

FIG. 2 illustrates an internal configuration example of the gNB 100 that employs the fronthaul (FH) interface. As illustrated in FIG. 2, the gNB 100 includes an O-RAN distributed unit (O-DU) 110 and an O-RAN radio unit (O-RU) 120. The O-DU 110 and the O-RU 120 are functionally split in the physical (PHY) layer defined by the 3GPP.

The O-DU 110 may be called an O-RAN distribution unit. The O-DU 110 is a logical node that hosts a radio link control layer (RLC), a medium access control layer (MAC), and a PHY-High layer based on the functions of lower level layers.

The O-RU 120 may be called an O-RAN radio unit. The O-RU 120 is a logical node that hosts the PHY-Low layer and RF processing based on the functional division of the lower layers.

The PHY-High layer is a portion of the PHY processing on the O-DU 110 side of the fronthaul interface such as forward error correction (FEC) encoding/decoding, scrambling, modulation, and demodulation.

The PHY-Low layer is a portion of the PHY processing on the O-RU 120 side of the fronthaul interface such as fast Fourier transform (FFT)/iFFT, digital beamforming, physical random access channel (PRACH) extraction, and filtering.

An O-CU is an abbreviation for an O-RAN Control Unit and is a logical node that hosts packet data convergence protocol (PDCP), radio resource control (RRC), service data adaptation protocol (SDAP), and other control functions.

Note that the fronthaul (FH) may be interpreted as a line between the baseband processing unit of the radio base station (base station device) and the radio device, and an optical fiber or the like is used.

(3) Shared Cell Configuration

In the O-RAN, as described above, there is also a station placement method in which one cell is configured with a plurality of O-RUs, and a configuration using a device (FHM: Fronthaul Multiplexing) that bundles the O-RUs and a configuration (cascade configuration) in which the O-RUs are continuously connected has been considered. These configurations are collectively called a Shared Cell.

Figure 3A:
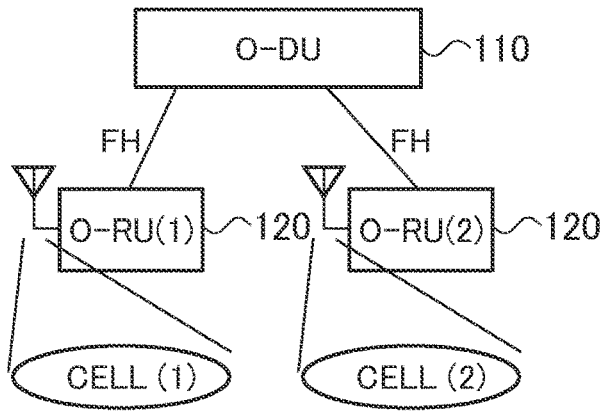
FIG. 3A is a diagram illustrating a configuration example of a fronthaul (without an intermediate device).
Figure 3B:
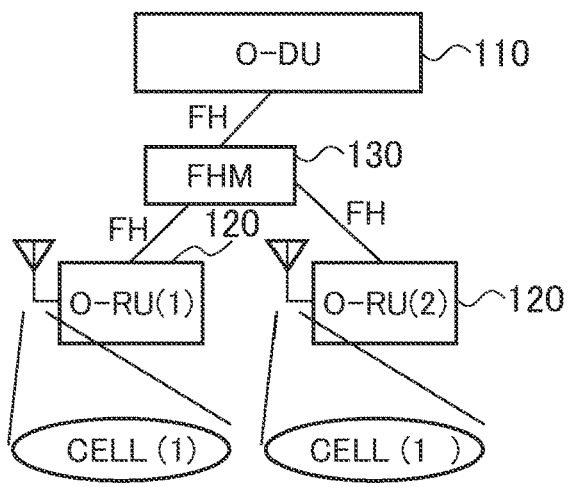
FIG. 3C is a diagram illustrating a configuration example of a fronthaul (with intermediate device, cascade configuration).
Figure 3C:
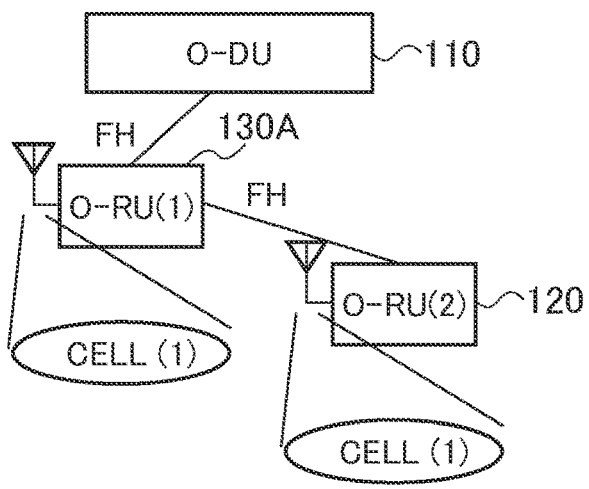

FIGS. 3A to 3C illustrate configuration examples of the fronthaul. FIG. 3A is an example of configuring one cell with one O-RU. Cn the other hand, FIG. 3B and FIG. 3C illustrate examples of Shared Cell configurations.

Specifically, FIG. 33 illustrates a configuration example using an FHM 130. Further, FIG. 3C illustrates an example in which the O-RU 130A is interposed between the O-DU 110 and the O-RU 120 and cascade-connected.

In the case of FIG. 3B, the FHM 130 combines the two FH signals from the respective O-RUs 120 (pre-stage devices) and then transmits the combined signal to the O-DU 110.

In addition, in the case of FIG. 3C, the O-RU 130A combines the signal received by the O-RU 130A (O-RU (1)) itself in the radio section and the FH signal received from the O-RU 120 (O-RU (2)) and then transmits the combined signal to the O-DU 110.

In addition, in the following description, the FHM 130 and the O-RU 130A are collectively referred to as the intermediate device 130. However, the name of the intermediate device may be called by another name.

As a characteristic of such a shared cell configuration, for the downlink (DL), the intermediate device 130 forwards the signal received from the pre-stage device to the post-stage device. In addition, in the case of cascade connection of the O-RU, the signal is also transmitted as a radio signal of the O-RU itself.

Further, for the uplink (UL), the intermediate device 130 combines the UL signals received from the pre-stage device and forwards the combined signals to the post-stage device. In addition, in the case of cascade connection of the O-RU, the radio signal received by the O-RU itself is also combined.

Due to such characteristics, the O-DU 110 can perform signal processing as if one O-RU is connected.

(4) Various Signals Between O-DU and O-RU

Figure 4:
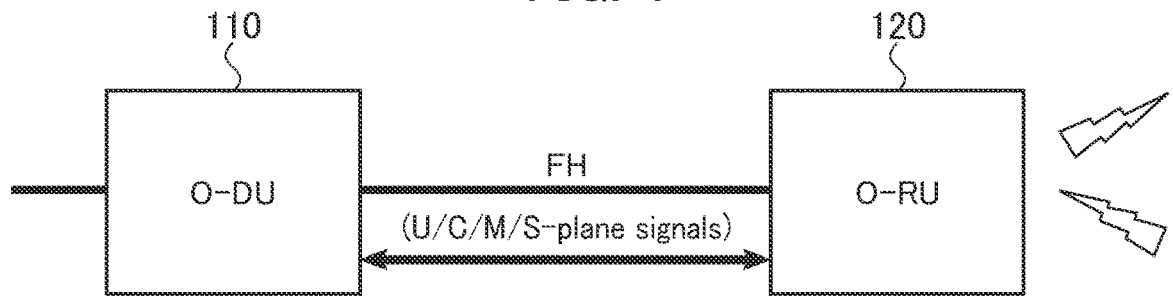
FIG. 4 is a diagram illustrating various signals in a fronthaul (FH) between an O-DU 110 and an O-RU 120.

FIG. 4 illustrates various signals in the fronthaul (FH) between the O-DU 110 and the O-RU 120. As illustrated in FIG. 4, signals in a plurality of planes are transmitted and received between the O-DU 110 and the O-RU 120.

Specifically, U/C/M/S-plane signals are transmitted and received. The C-Plane is a protocol for forwarding control signals, and the U-Plane is a protocol for forwarding user data. In addition, the S-Plane is a protocol for realizing synchronization between devices. The M-Plane is a management plane which handles maintenance supervisory signals.

More specifically, the U-plane signals include signals transmitted (DL) by the O-RU 120 in the radio section and signals received (UL) by the radio section and are exchanged by digital IQ signals. In addition to so-called U-plane signals (data such as user datagram protocol (UDP) and transmission control protocol (TCP)), it should be noted that all the C-Planes (RRC, Non-Access Stratum (NAS), and the like) defined in 3GPP also become the U-planes from the viewpoint of the FH.

The C-plane signals include signals (signals for notifying information on radio resource mapping of the corresponding U-Plane and beamforming) necessary for various controls related to transmission and reception of the U-plane signals. In addition, it should be noted that the C-Planes (RRC, NAS, and the like) defined in 3GPP indicate completely different signals.

The M-plane signal includes a signal necessary for managing the C-DU 110/O-RU 120. For example, the M-plane signal is a signal for notifying various hardware (HW) capacities of the O-RU 120 from the O-RU 120 or for notifying various setting values from the O-DU 110 to the O-RU 120.

The S-plane signal is a signal necessary for synchronization control between the O-DU 110 and the O-RU 120.

(5) Functional Block Configuration of Wireless Communication System

Next, a functional block configuration of the radio communication system 10 will be described. Specifically, the functional block configurations of the O-DU 110 and the intermediate device 130 will be described.

(5.1) O-DU110

Figure 5:
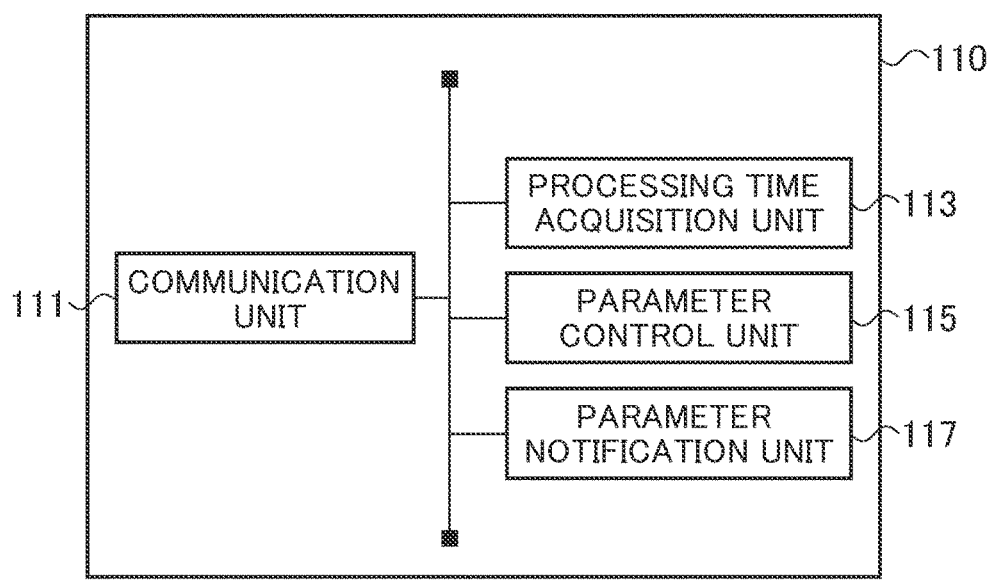
FIG. 5 is a functional block configuration diagram of the O-DU 110.

FIG. 5 is a functional block configuration diagram of the O-DU 110. As illustrated in FIG. 5, the O-DU 110 includes a communication unit 111, a processing time acquisition unit 113, a parameter control unit 115, and a parameter notification unit 117.

The communication unit 111 executes communication with the O-RU 120 and the intermediate device 130.

Specifically, the communication unit 111 is connected to the FK line and can transmit and receive signals of various planes illustrated in FIG. 4.

The processing time acquisition unit 113 acquires information on the processing time of the intermediate device 130. Specifically, the processing time acquisition unit 113 receives, from the intermediate device 130 provided on the FH, processing time information indicating the processing time in the intermediate device 130. In the present embodiment, the processing time acquisition unit 113 constitutes a receiving unit that receives the processing time information. In addition, in the present embodiment, the O-DU 110 constitutes a communication device including a receiving unit that receives the processing time information.

The processing time in the intermediate device 130 may be interpreted as a time in the intermediate device 130 required to combine the FH signals received from the plurality of O-RUs 120 in the intermediate device 130. In addition, the processing time may be a time required for the combination itself plus a time such as a certain margin.

In addition, the processing time may be called by another name for example, an operation time, an internal delay, a processing delay, a combination time, or the like.

The parameter control unit 115 controls the values of various parameters used on the FH. In particular, in the present embodiment, the parameter control unit 115 controls the value regarding the propagation delay between the O-DU 110 and the O-RU 120 (including a case where the intermediate device 130 is interposed).

More specifically, the parameter control unit 115 can acquire or decide the propagation delay (T34_min and T34_max) in the DL between the O-DU 110 and the O-RU 120.

Further, the parameter control unit 115 can decide the propagation delay (Ta4_min and Ta4_max) in the UL (between the O-DU 110 and the O-RU 120) applied to the O-DU 110 itself based on the T34_min and the T34_max.

The Ta4 may be interpreted as a measurement result from the reception at the O-RU antenna to the reception at the O-DU port (R4). Further, the Ta3_min and the Ta3_raax described later may be interpreted as measurement results from the reception at the O-RU antenna to the output at the O-RU port (R3).

Note that min and max may denote the minimum value and the maximum value of the propagation delay. Further, the propagation delay may be called by another name, for example, transmission delay, transmission time, delay time, forwarding delay, delay, or the like.

In this embodiment, the parameter control unit 115 can decide the capability information set for the intermediate device 130 based on at least the processing time information indicating the processing time in the intermediate device 130 described above. In the present embodiment, the parameter control unit 115 constitutes a control unit.

Herein, the capability information set for the intermediate device 130 may correspond to the Ta3_min and/or the Ta3_max described above. In addition, the capability information may include a waiting time (T_waiting time (1)) applied to the intermediate device 130. Further, the details of the capability information will be described later.

In addition, the parameter control unit 115 may decide the capability information set for the intermediate device 130 based on at least the processing time information indicating the processing time in the intermediate device 130 and the capability information (Ta3_min and Ta3_max) of the pre-stage device (O-RU 120) provided on the FK.

Further, the parameter control unit 115 may decide the capability information set for the intermediate device 130 based on the delay time (corresponding to T34) between the intermediate device 130 and the O-DU 110.

Alternatively, the parameter control unit 115 may decide the capability information set for the intermediate device 130 based on the total delay time (Ta4_min, Ta4_max) in the FH.

The parameter notification unit 117 notifies the intermediate device 130 of at least a portion of the parameters decided by the parameter control unit 115.

Specifically, the parameter notification unit 117 can transmit the capability information set for the intermediate device 130 to the intermediate device 130. In the present embodiment, the parameter notification unit 117 constitutes a transmitting unit that transmits the capability information to the intermediate device 130.

(5.2) Intermediate Device 130

Figure 6:
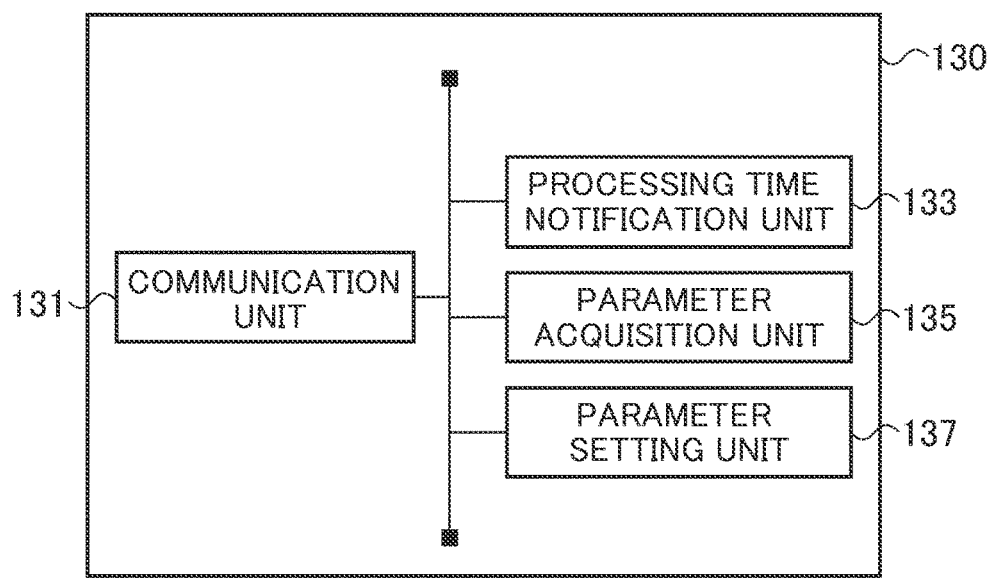
FIG. 6 is a functional block configuration diagram of an intermediate device 130.

FIG. 6 is a functional block configuration diagram of the intermediate device 130. As illustrated in FIG. 6, the intermediate device 130 is provided on the FH and includes a communication unit 131, a processing time notification unit 133, a parameter acquisition unit 135, and a parameter setting unit 137.

The communication unit 131 executes communication with the O-DU 110 and the O-RU 120. Specifically, the communication unit 131 is connected to the FH line and can transmit and receive signals of various planes illustrated in FIG. 4.

The processing time notification unit 133 notifies the O-DU 110 of information on the processing time of the intermediate device 130. Specifically, the processing time notification unit 133 transmits the processing time information indicating the processing time in the intermediate device 130 to the post-stage device, specifically, the O-DU 110 provided on the intermediate device 130. In the present embodiment, the processing time notification unit 133 constitutes a transmitting unit that transmits the processing time information to the post-stage device. Further, in the present embodiment, the intermediate device 130 constitutes a communication device including a transmitting unit that transmits the processing time information to the post-stage device.

The parameter acquisition unit 135 acquires the parameters decided by the O-DU 110. Specifically, the parameter acquisition unit 135 acquires parameters regarding the propagation delay decided by the O-DU 110.

In particular, the parameter acquisition unit 135 receives the capability information (corresponding to Ta3_min and/or Ta3_max) decided based on the processing time information described above from the O-DU 110. In the present embodiment, the parameter acquisition unit 135 constitutes a receiving unit that receives the capability information decided based on the processing time information.

The parameter setting unit 137 sets the parameter applied to the intermediate device 130 based on the parameter acquired by the parameter acquisition unit 135, specifically, based on the capability information decided based on the processing time information.

Specifically, the parameter setting unit 137 sets the sizes of the transmission window and the reception window for the FH signal applied to the intermediate device 130 based on the capability information (corresponding to Ta3_min and/or Ta3_max) decided based on the processing time information indicating the processing time in the intermediate device 130.

(6) Operation of Wireless Communication System

Next, the operations of the radio communication system 10 will be described. Specifically, the operations between the O-DU 110 and the O-RU 120 (including the intermediate device 130) constituting the gNB 100 will be described.

(6.1) Delay Management in Fronthaul

Figure 7:
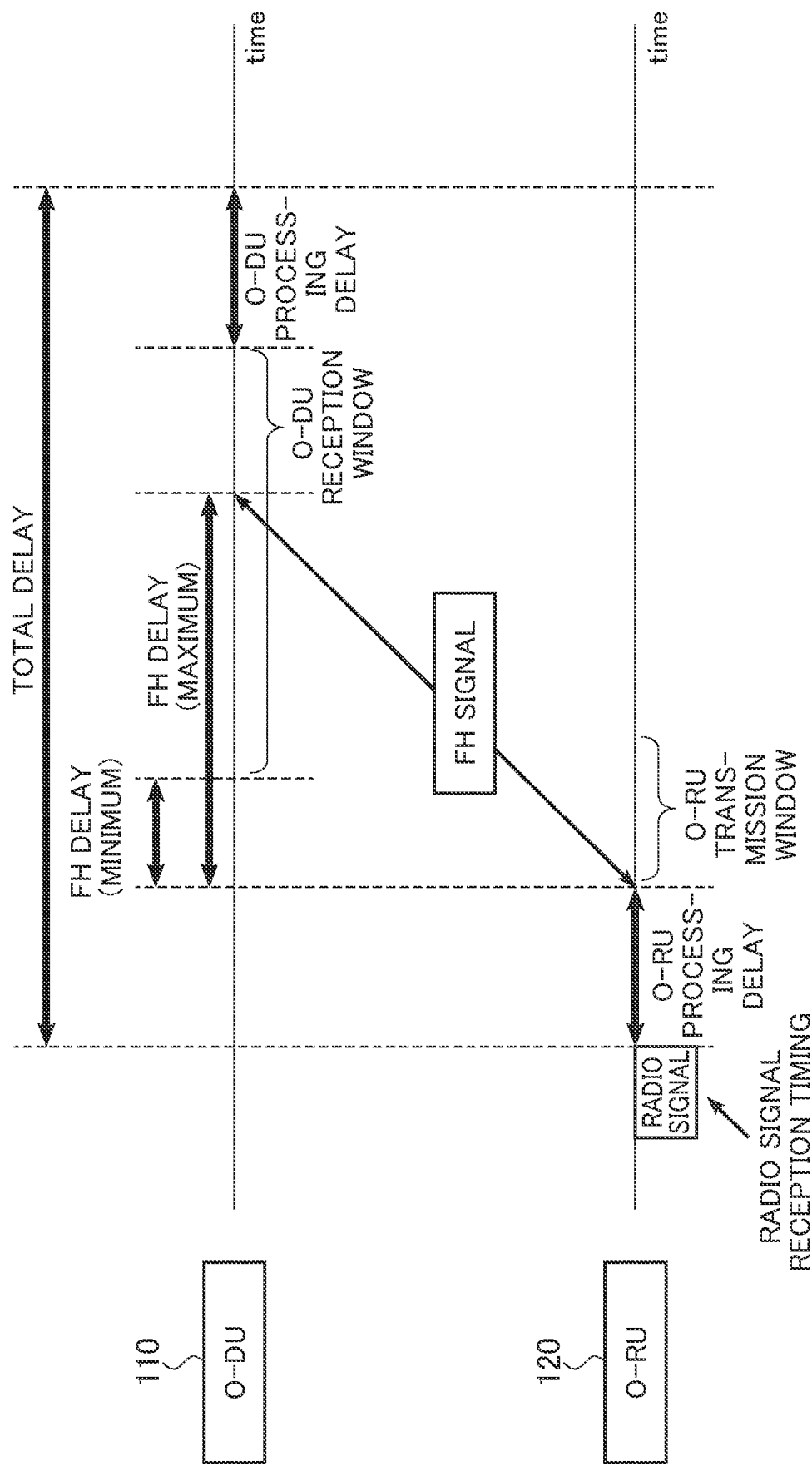
FIG. 7 is an explanatory diagram of delay management between the O-DU 110 and the O-RU 120.

FIG. 7 is an explanatory diagram of the delay management between the O-DU 110 and the O-RU 120. As described above, since the function sharing points of the O-DU 110 and the O-RU 120 are placed in the physical (PHY) layer, strict timing accuracy is required. For this reason, the delay management of the FH is performed, and the transmission window and the reception window are used as the method of the delay management.

In FIG. 7, an example of the UL signal is illustrated. In addition, basically, the DL signal is similar to the UL signal. In the following description the UL signal will be described as an example.

Since the propagation delay fluctuates according to the FH configuration, the maximum value and the minimum value of the delay need to be considered. In FIG. 7 (similarly thereafter), for the ease of illustration, it is assumed that the FH signal satisfies the following conditions.

The FH signal transmits at the edge of the transmission window

The propagation delay of the FH is maximum

As illustrated in FIG. 7, the O-RU 120 transmits the FH signal during the transmission window. In addition, the O-DU 110 receives the FH signal during the reception window. The delay management in the FH needs to be performed so that these two points are satisfied. In a case where these two points are not satisfied, communication of FH signals may be impossible.

Mote that the delay management herein is assumed to include both of the followings.

Management of FH delay itself

Management of sizes of the transmission window and the reception window

In addition, the delay management is performed with the reception timing of the radio signal from the UE 200 in the O-RU 120 as reference.

Figure 8:
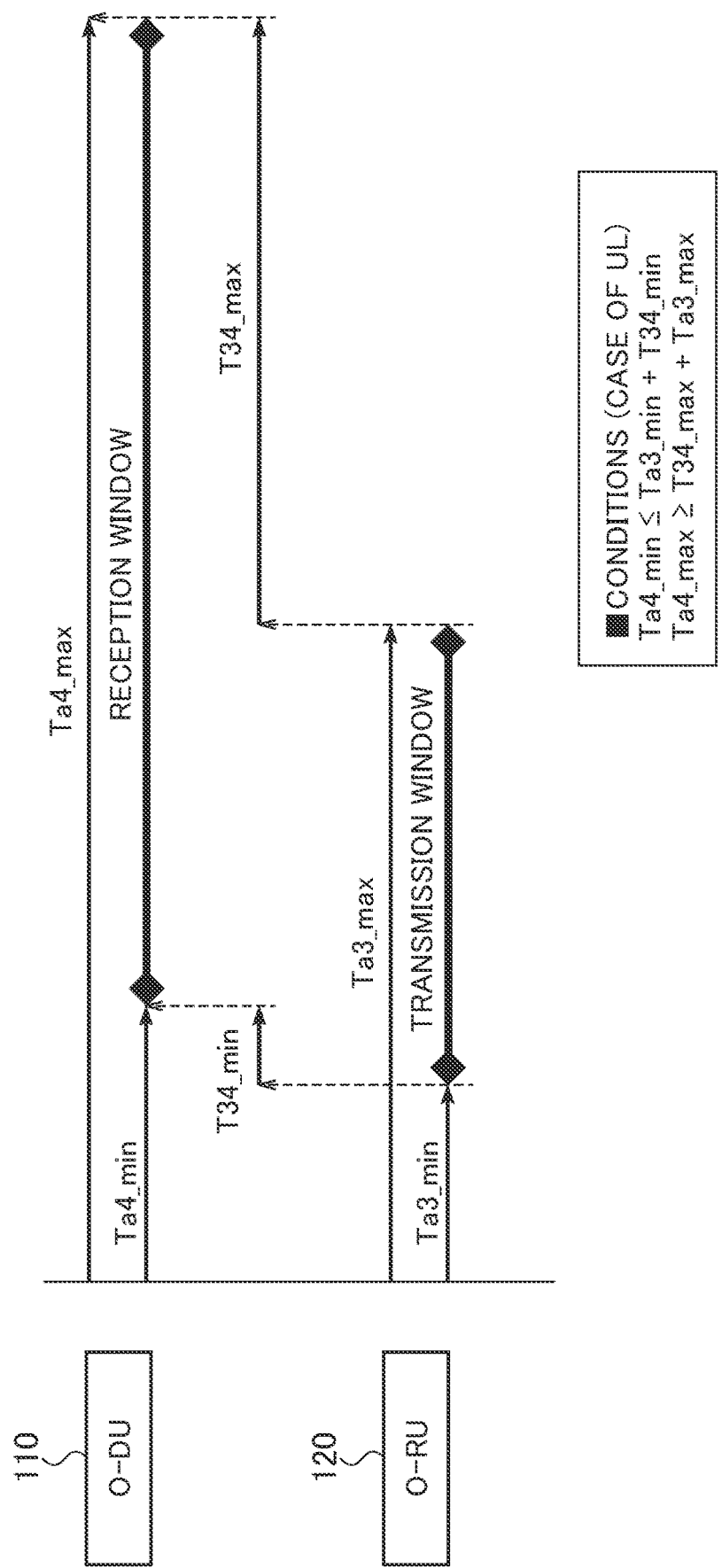
FIG. 8 is a diagram illustrating a relationship between delay-related parameters defined in O-RAN FH specifications and a transmission window and a reception window.

FIG. 8 illustrates the relationship between delay-related parameters defined in the O-RAN FH specifications and the transmission window and the reception window.

In the O-RAN FH specifications parameters that represent both ends of the transmission window and the reception window are defined. The O-DU 110 performs the delay management by deciding transmission window (for DL) and reception window (for UL) of the O-DU itself according to the O-RU 120.

Specifically, the O-RU 120 notifies the O-DU 110 of the Ta3_max and the Ta3_min as capability values of the O-RU itself.

The O-DU 110 decides the Ta4_max and the Ta4_min of the O-DU itself based on the values of T34_max and T34_min set in advance and the notified values of Ta3_max and Ta3_min. At this time, as illustrated in FIG. 8, the following conditions are needed to be satisfied.

$Ta4\_min <= Ta3\_min + T34\_min$ $Ta4\_max >= T34\_max + Ta3\_max$

According to such delay management, the O-RU 120 only operates based on capability values of the O-RU itself, and the delay management (control) is performed by the O-DU 110. Therefore, even in a case where the O-RU 120 is stationed in various manners, there is an advantage that the delay management by only the O-DU 110 side is considered.

(6.2) Problem in Shared Cell Configuration

In the case of the shared cell configuration as illustrated in FIGS. 3B and 3C, since the FH delay is changed between the O-DU to the intermediate device/between the intermediate device to the intermediate device/and between the intermediate device to the O-RU according to the station placement of the intermediate device 130, the appropriate size of the transmission window of the intermediate device depends on the station placement (fixing position) of the intermediate device.

Figure 9:
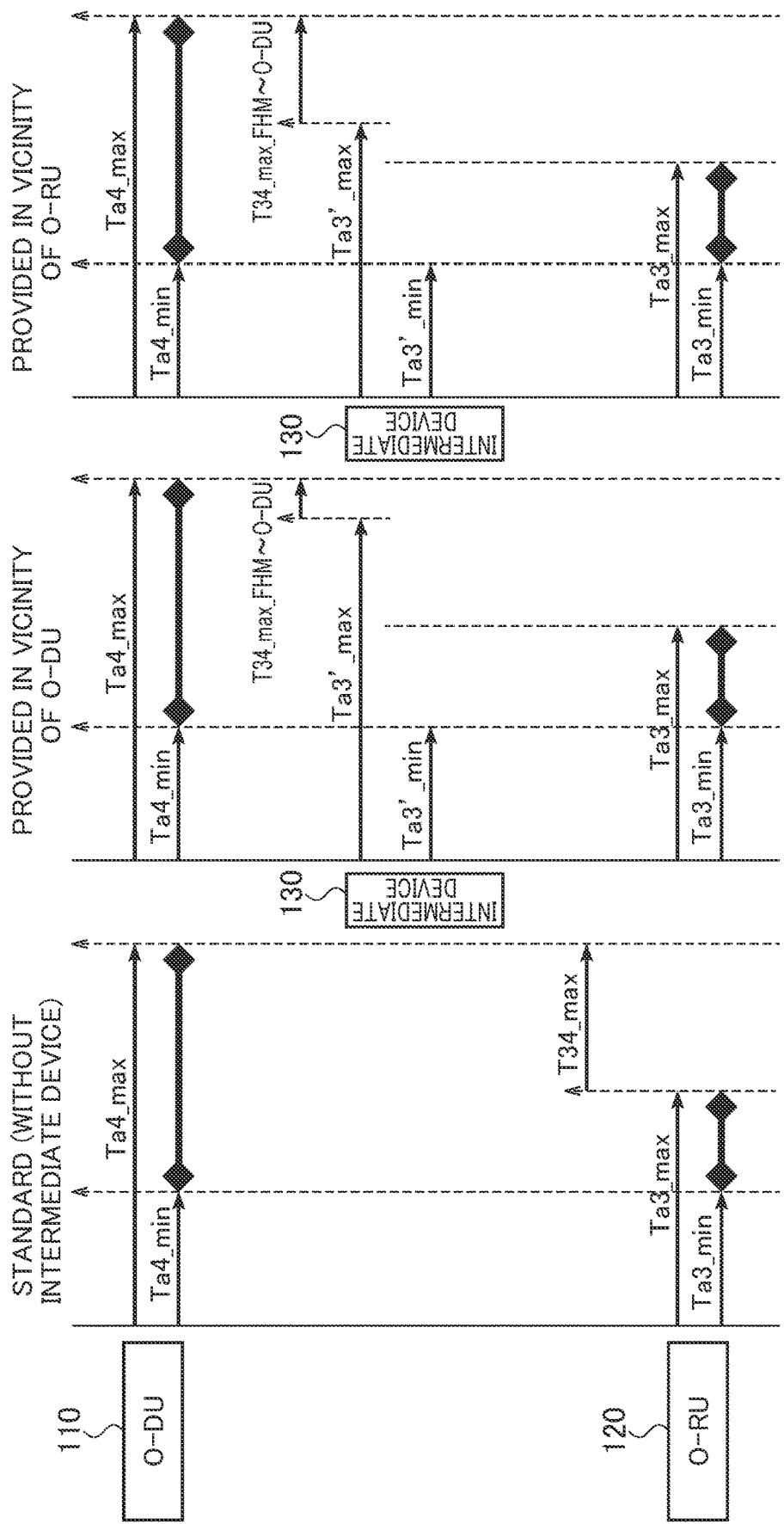
FIG. 9 is an explanatory diagram of a problem of delay management in a case where the intermediate device 130 is interposed.

FIG. 9 is an explanatory diagram of a problem of delay management in a case where the intermediate device 130 is interposed. Note that FIG. 9 illustrates an example of T34_min=0 for the ease of illustration.

As illustrated in FIG. 9, since the Ta3_max and the Ta3_min are defined as device-specific capabilities, the size of the transmission window cannot be set according to the station placement, and as a result, there is a possibility that the transmission and the reception of the FH signals may not be performed correctly.

Specifically/since the intermediate device 130 (FHM and the like) is inserted into the MW in which the delay management between the O-DU and the O-RU is performed, the Ta3_max and the Ta3_min (hereinafter, Ta3'_max and Ta3'_min) need to be appropriate values, but the appropriate values depend on the station placement position (FH delay amount of the O-DU to the intermediate device, and the like), and thus, in some cases, the device-specific value may not operate properly.

Further, the intermediate device 130 needs to wait for the signal of the pre-stage device because the intermediate device combines the signals of the pre-stage device (O-RU) in the UL. As described above, since the FH delay is changed between the f O-DU and the intermediate device, between the intermediate device and the intermediate device, and between the intermediate device and the O-RU according to the station placement of the intermediate device 130, the required waiting time depends on the station placement of the intermediate device 130.

Specifically, it is necessary to set the appropriate waiting time by adding the FH delay between the O-RU and the intermediate device. Further, with respect to the time until the transmission, the processing time required for signal combination need be taken into consideration.

However, there is no regulation regarding "waiting time for combining signals of pre-stage device", and the intermediate device 130 cannot set an appropriate waiting time. For this reason, there is a problem that all the signals from the pre-stage device cannot be received (combined) due to short waiting time of the intermediate device 130 or a signal cannot be transmitted in time for the reception window of the post-stage device due to too long waiting time, and as a result, there is a possibility that the transmission and the reception of the FH signals may not be performed correctly.

(6.3) Operation Example

The above-mentioned problems are caused by the fact that various values regarding delay cannot be set to appropriate values according to the station position (FH delay time) of the intermediate device 130.

Therefore, in Operation Examples described below, the O-DU 110 calculates an appropriate value according to the station position (FH delay time) of the intermediate device 130 and sets the value (capability information) with respect to the intermediate device 130.

(6.3.1) Operation Example 1

Figure 10:
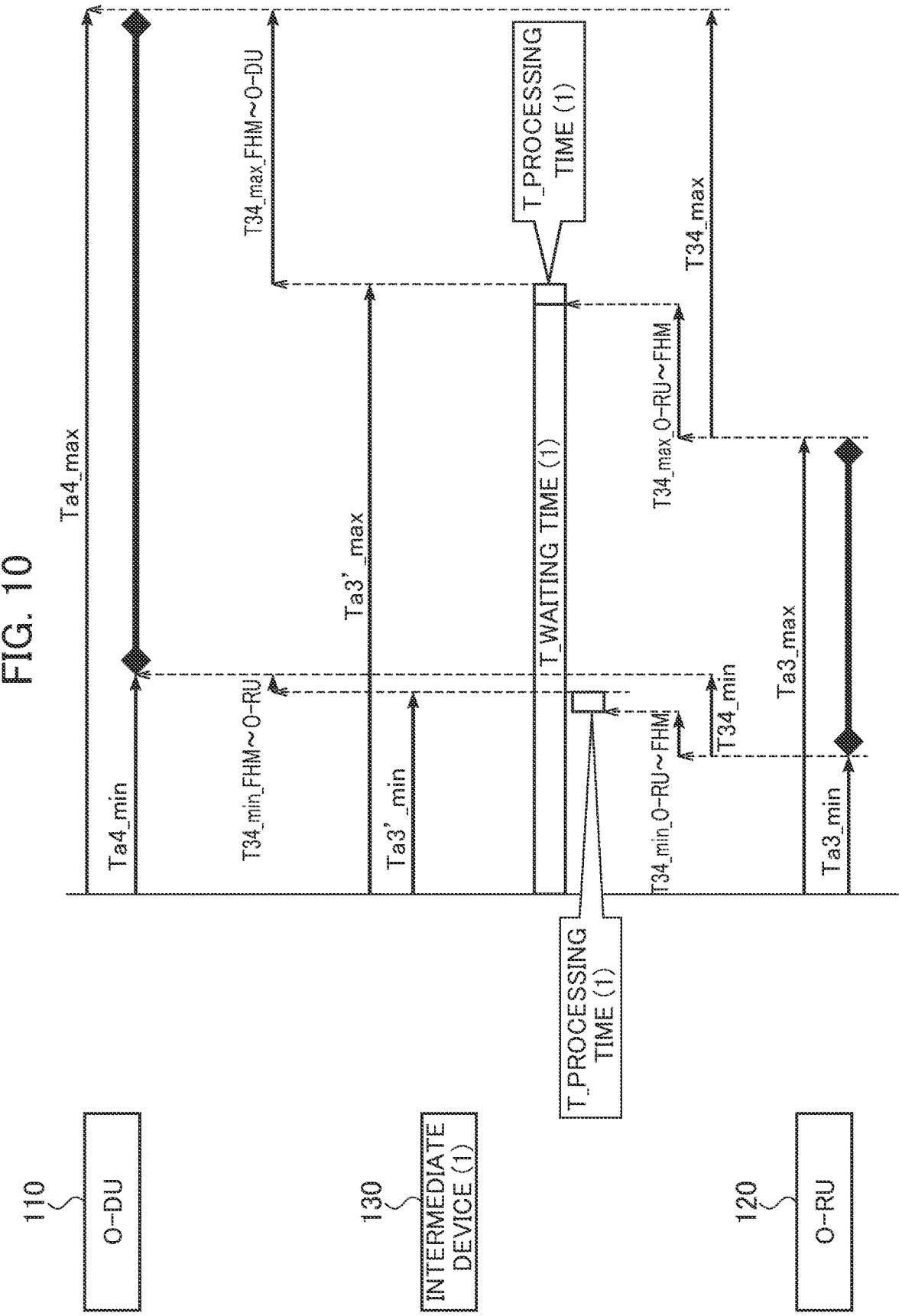
FIG. 10 is a diagram illustrating an example of delay management of a fronthaul according to Operation Example 1.

FIG. 10 illustrates an example of delay management of the fronthaul according to Operation Example 1. FIG. 10 illustrates an example in which the intermediate device 130 has one stage.

The parameters related to transmission in this Operation Example are as follows.

$Ta3'\_max = Ta4\_max - T34\_max\_FHM$ to O-DU $Ta3'\_min = Ta4\_min - T34\_min\_FHM$ to O-DU T34_max_FHM to O-DU: maximum delay time between the O-DU and the intermediate device (1)

$T34\_max\_FHM$ to O-DU=$T34\_max-T\_processing$ time(1)−$T34\_max\_O\text{-}RU$ to FHM T34_min_FHM to O-DU: minimum delay time between the O-DU and the intermediate device (1)

$T34\_min\_FHM$ to O-DU=$T34\_min-T\_processing$ time (1)−$T34\_min\_O\text{-}RU$ to FHM In addition, the time to wait for the UL signal in the post stage is as follows.

$T\_waiting\ time\ (1) = Ta3'\_max - T\_processing\ time\ (1)$

Note that in a case where the plurality of O-RUs is connected to the subordinates of the intermediate device 130 (FHM), "T34__max_O-RU~FHM" and T34_rain_O-RU~FHM" of the O-RU that maximizes T34_max_O-RU~FHM among all the O-RUs are used.

In a case where the delay management illustrated in FIG. 10 is performed/the intermediate device 130 (intermediate device (1)) notifies the O-DU 110 of the following information as the capability of the intermediate device (1).

T_processing time (1)

The O-DU 110 notifies the intermediate device 130 (intermediate device (1)) of the following parameters and sets the parameters.

Ta3'_max/Ta3'_max

Note that the O-DU 110 may also notify T_waiting time (1) in addition to the Ta3'_max and the Ta3'_max (capability information). Alternatively, the O-DU 110 does not notify the T_waiting time (I), and the intermediate device 130 (intermediate device (1) may be allowed to calculate the T_waiting time (1) based on Ta3'_max and the T_processing time (1) of the intermediate device itself.

In addition, in a case where a new O-RU is added during the operation of the radio communication system 10 (gNB 100) and T34_max_O-RU to FHM of the O-RU is maximized, The control for updating the values of various parameters at the time when the O-RU is added may be executed.

(6.3.2) Operation Example 2

Figure 11:
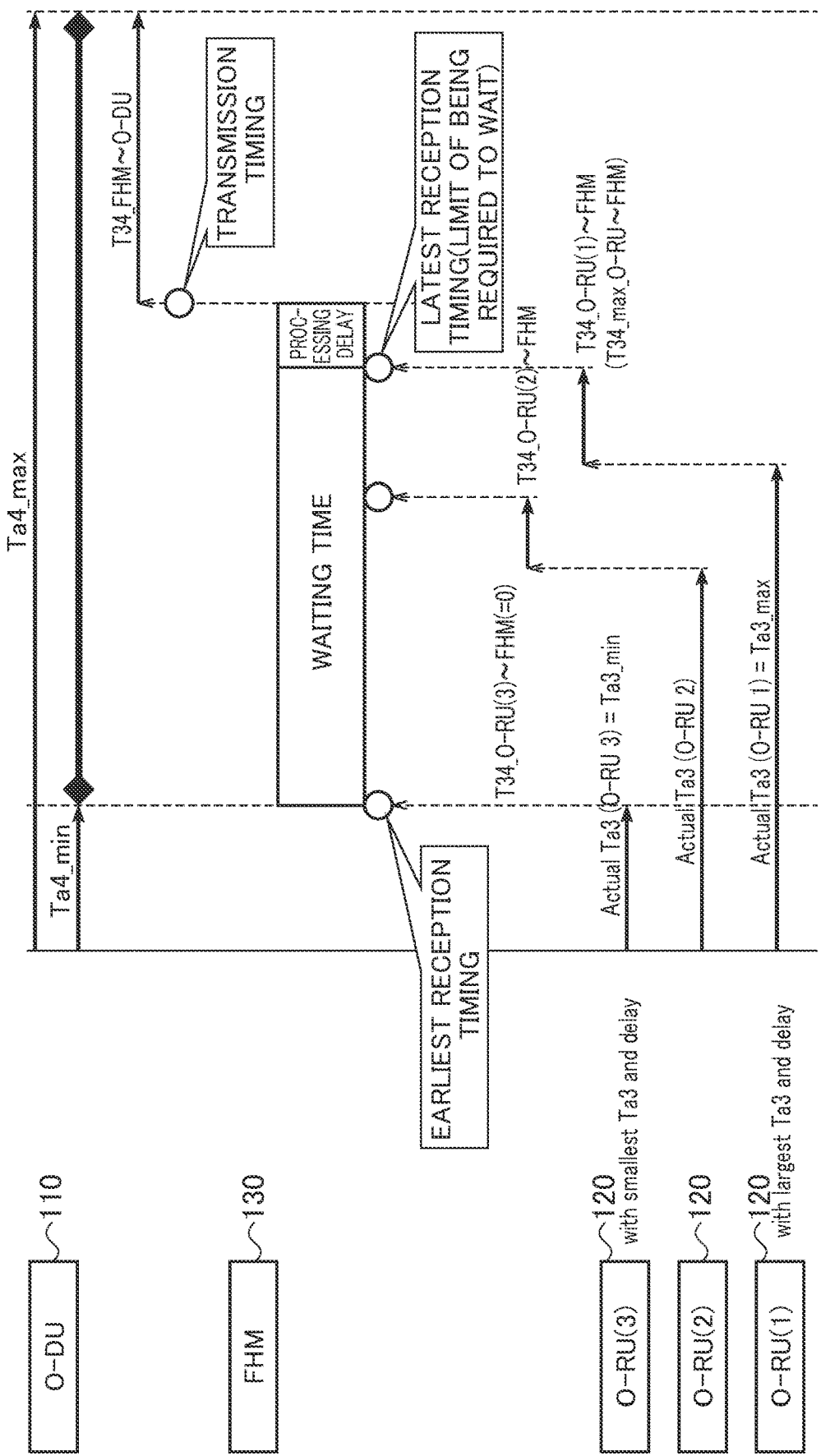
FIG. 11 is a diagram illustrating an example of delay management of a fronthaul according to Operation Example 2.

FIG. 11 illustrates an example of the delay management of the fronthaul according to Operation Example 2. FIG. 11 illustrates an example in which the intermediate device 130 has one stage and a plurality of O-RUs is connected to the subordinates of the intermediate device 130.

Specifically, in the example illustrated in FIG. 11, three O-RUs 120 are connected to the intermediate device 130 (FHM). In such a case, as illustrated in FIG. 11, there are the FH signal of the O-RU 120 that reaches the intermediate device 130 at the earliest reception timing and the FH signal (this becomes a limit that the intermediate device 130 needs to wait) of the O-RU 120 that reaches the intermediate device 130 at the latest reception timing.

In this case, the O-DU 110 calculates the various parameters shown in Operation Example 1 based on the value of the O-RU (1) having the largest propagation delay between the O-RU and the intermediate device (FHM).

(6.3.3) Operation Example 3

Figure 12:
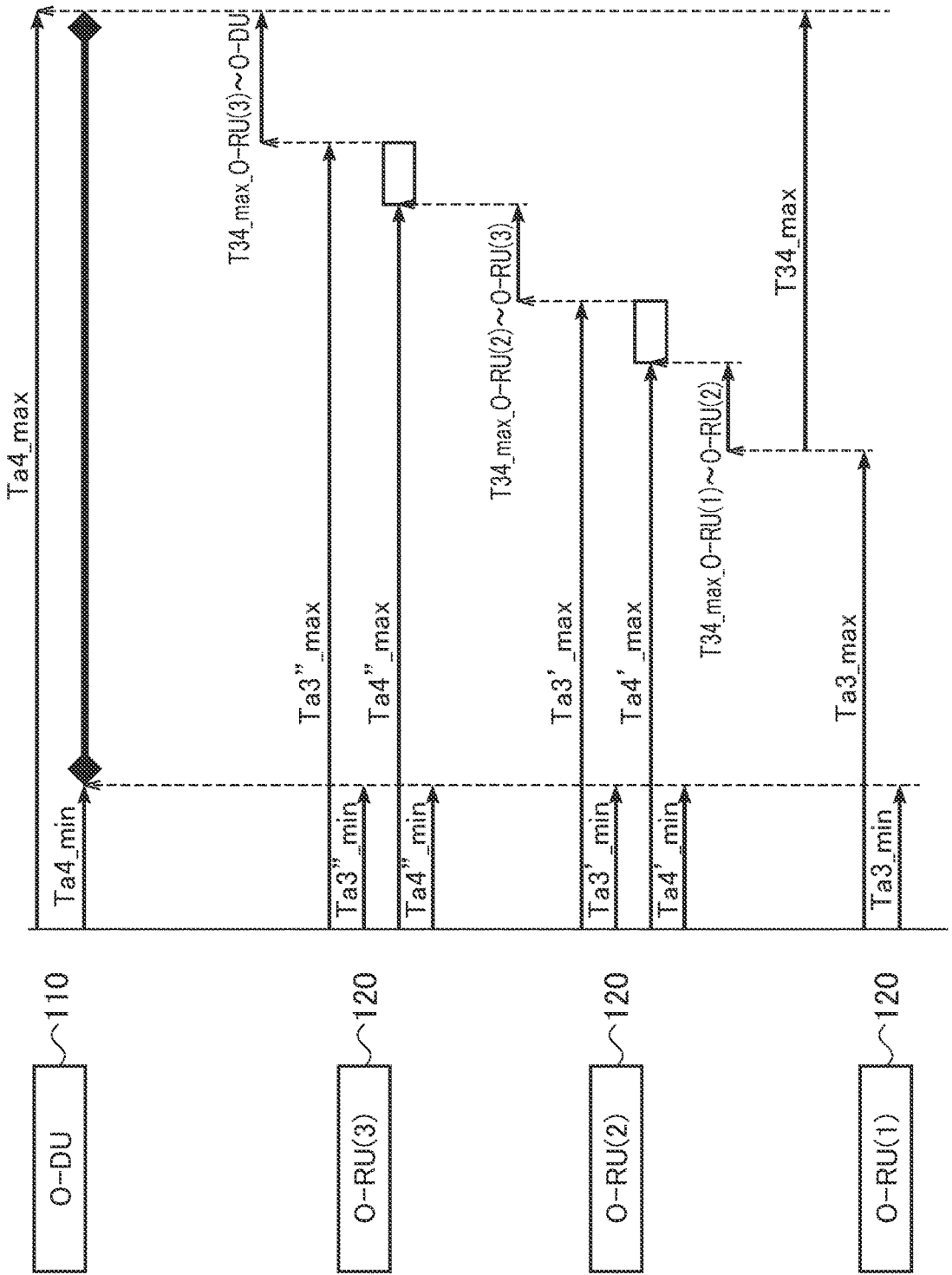
FIG. 12 is a diagram illustrating an example of delay management of a fronthaul according to Operation Example 3.

FIG. 12 illustrates an example of delay management of a fronthaul according to Operation Example 3. In FIG. 12, an example in which the intermediate device 130 has a plurality of stages is illustrated. Specifically, FIG. 12 illustrates an example in which a plurality of O-RUs 120 are cascade-connected.

Even in such a case, calculation of various parameters can be realized by a method similar to that of a case where the intermediate device 130 has one stage. Specifically/the calculation can be performed similarly to a case where the intermediate device 130 shown in Operation Example 1 has one stage, except that reverse calculation is sequentially performed from the O-RU at the most front stage (the bottom stage in the figure).

In addition, setting of the calculated parameters may be performed in accordance with Operation Example 1.

(7) Function and Effect

According to the above-described embodiment, the following functions and effects can be obtained. Specifically, according to the O-DU 110 of the gNB 100, based on the processing time information indicating the processing time (T_processing time (1)) in the intermediate device 130 received from the intermediate device 130, the capability information (Ta3'_max and Ta3'_min) set for the intermediate device 130 can be decided, and the decided capability information can be transmitted to the intermediate device 130.

For this reason, even in a case where the shared cell configuration in the fronthaul (FH; interface is applied, the appropriate sizes of the transmission window and the reception window in consideration of the station placement (fixing position) of the intermediate device 130 can be set. That is, according to the gNB 100, it is possible to correctly transmit and receive the FH signal even in a case where the shared cell configuration is applied.

In the present embodiment, the O-DU 110 can decide capability information set for the intermediate device 130 based on at least the above-described processing time information and the capability information of the pre-stage device (O-RU 120) provided on the fronthaul. For this reason, in a case where the shared cell configuration is applied, it is possible to set more appropriate sizes of the transmission window and the reception window.

In the present embodiment, the O-DU 110 can decide the capability information set with respect to the intermediate device 130 based on the delay time (corresponding to T34_max and T34_min) between the intermediate device 130 and the O-DU 110 or the total delay time (Ta4_max and Ta4_min) in the FH. For this reason, in a case where the shared cell configuration is applied, it is possible to set more appropriate sizes of the transmission window and the reception window.

(8) Other Embodiments

Heretofore, although the contents of the present invention have been described with reference to the embodiments, it is obvious to those skilled in the art that the present invention is not limited to these descriptions and various modifications and improvements can be made.

For example, in the embodiment described above, as illustrated in FIGS. 3B and 3C, as the intermediate device 130, an example in which the FHM or the O-RU (cascade connection) is applied is illustrated separately, but on the same FH, the FHM and the O-RU by cascade connection may be configured in a composite manner.

In addition, in the above-described embodiment, the FH configuration compliant to the O-RAN specifications has been described, but the FH does not necessarily have to comply with the O-RAN specifications. For example, at least a portion of the O-DU 110, the O-RU 120, and the intermediate device 130 may comply with the FH specifications defined in the 3GPP.

The block diagram used for explaining the embodiments (FIGS. 5 and 6) illustrates blocks of functional unit. Those functional blocks (structural components) can be realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting may be called a transmitting unit or a transmitter. For any of the above, as explained above, the realization method is not particularly limited to any one method.

Figure 13:
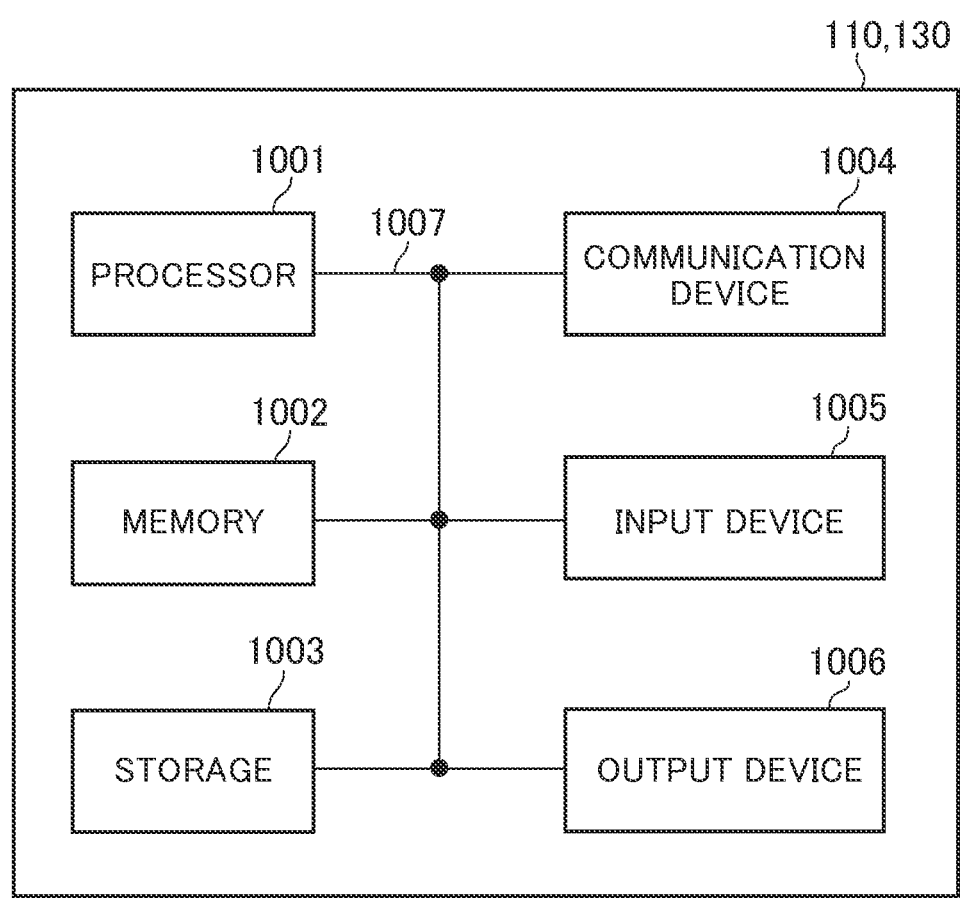
FIG. 13 is a diagram illustrating an example of a hardware configuration of the O-DU 110 and the intermediate device 130.

Furthermore, the O-DU 110 and the intermediate device 130 (the device) explained above can function as a computer that performs the processing of the radio communication method of the present disclosure. FIG. 13 is a diagram illustrating an example of a hardware configuration of the device. As illustrated in FIG. 13, the device can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices illustrated in the figure, or can be constituted by without including a part of the devices.

The functional blocks (see FIGS. 5 and 6) of the device can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the device by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (computer program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main storage device), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-RCM), a hard disk drive a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that output data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD) and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, broadcasting information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTS-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, computer program code, computer program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair. Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS>", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

A radio frame may be configured with one or more of frames in the time domain. Each of one or more of frames in the time domain may be called a subframe.

A subframe may also be configured with one or more slots in the time domain. The subframe may have a fixed time length (for example, 1 ms) that does not depend on numerology.

The numerology may be a communication parameter applied to transmission and/or reception of a signal or channel. Numerology may indicate, for example, at least one of subcarrier spacing (SCS), a bandwidth, a symbol length, a cyclic prefix length, a transmission time interval (TTI), the number of symbols per TTI, a radio frame configuration, a specific filtering processing performed by a transreceiver in the frequency domain and a specific windowing processing performed by a transceiver in the time domain.

A slot may be configured with one or more symbols (Orthogonal Frequency Division Multiplexing (OFDM) symbols, Single Carrier Frequency Division Multiple Access (SC-FDMA) symbols, or the like) in the time domain. A slot may be a time unit based on the numerology.

The slot may include a plurality of minislots. Each minislot may be configured with one or more symbols in the time domain. In addition, the minislot may also be called a subslot. The minislots may be configured with fewer symbols than the slots. The PDSCH (or PUSCH) transmitted in a time unit larger than the minislot may be called a PDSCH (or PUSCH) mapping type A. The PDSCH (or PUSCH) transmitted using the minislot may be called PDSCH (or PUSCH) mapping type B.

The radio frame, the subframe, the slot, the minislot, and the symbol all represent a time unit for transmitting a signal. The radio frame, the subframe, the slot, the minislot, and the symbol may be referred to as different names corresponding to thereof.

For example, one subframe may be called a transmission time interval (TTI), a plurality of consecutive subframes may be called TTI, and one slot or one minislot may be called TTI. That is, at least one of the subframe and the TTI may be a subframe (1 ms) in an existing LTE, may be a period shorter than 1 ms (for example, 1-13 symbols), and may be a period longer than 1 ms. Note that the unit representing the TTI may be called a slot, a minislot, or the like instead of a subframe.

Herein, the TTI denotes, for example, the minimum time unit of scheduling in radio communication. For example, in the LTE system, the base station performs scheduling to allocate radio resources (frequency band width that can be used in each user terminal, transmission power, or the like) to each user terminal in units of a TTI. Note that the definition of TTI is not limited to this.

The TTI may be a transmission time unit such as a channel-coded data packet (transport block), a code block, and a codeword and may be a processing unit such as scheduling or link adaptation. Note that, when a TTI is given, the time interval (for example, the number of symbols) in which a transport block, a code block, a codeword, and the like are actually mapped may be shorter than the TTI.

Note that, when one slot or one minislot is called a TTI, one or more TTIs (that is, one or more slots or one or more minislots) may be the minimum time unit of scheduling. Also, the number of slots (the number of minislots) constituting the minimum time unit of the scheduling may be controlled.

The TTI having a time length of 1 ms may be called a general TTI (TTI in LTE Rel. 8-12), a normal TTI, a long TTI, a general subframe, a normal subframe, a long subframe, a slot, or the like. The TTI shorter than the general TTI may be called a shortened TTI, a short TTI, a partial TTI (partial or fractional TTI), a shortened subframe, a short subframe, a minislot, a subslot, a slot, or the like.

Note that a long TTI (for example, a general TTI, a subframe, or the like) may be read as a TTI having a time length of more than 1 ms, and a short TTI (for example, a shortened TTI) may be read as a TTI having a TTI length less than the TTI length of a long TTI and 1 ms or more.

The resource block (RB) is a resource allocation unit in the time domain and the frequency domain, and the resource block may include one or a plurality of continuous subcarriers in the frequency domain. The number of subcarriers included in the RB may be the same regardless of the numerology and may be, for example, 12. The number of subcarriers included in the RB may be decided based on the numerology.

Also, the time domain of the RB may include one or more symbols and may be one slot, one minislot, one subframe, or one TTI in length. One TTI, one subframe, or the like may be configured with one or more of the resource blocks.

Note that one or more RBs may be called physical resource blocks (Physical RB: PRB), subcarrier groups (SCG), resource element groups (REG), PRB pairs, RB pairs, or the like.

Moreover, the resource block may be configured with one or more resource elements (RE). For example, 1 RE may be a radio resource region of 1 subcarrier and 1 symbol.

A bandwidth part (BWP) (may be called partial bandwidth) may be a subset of continuous common RBs (common resource blocks) for a certain numerology in a certain carrier. Herein, the common RBs may be specified by the index of the RBs based on the common reference points of the carrier. The PRBs may be defined in a BWP and numbered within the BWP.

The BWP may include a BWP (UL BWP) for the UL and a BWP (DL BWP) for the DL. For the UE, one or more BWPs may be set in one carrier.

At least one of the set BWPs may be activated, and the UE may not be assumed to transmit or receive any predetermined signal/channel outside the activated BWP. Note that the "cell", the "carrier", and the like in the present disclosure may be read as the "BWP".

The structures of the radio frame, the subframe, the slot, the minislot, the symbol, and the like described above are merely examples. For example, the configuration such as the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol length, and the cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above-mentioned devices may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles shall include plurality of nouns following these articles.

The terms "determining" and "deciding" used in present disclosure may include a wide variety of operations. The terms "determining" and "deciding" may include, for example, considering judging, calculating, computing, processing, deriving, investigating, searching (looking up, search, inquiry) (for example, searching in a table, a database, or another data structure), ascertaining as "determining", "deciding", and the like. Moreover, the terms "determining" and "deciding" may include considering receiving (for example, receiving information), transmitting (for example, transmitting information), input, output, and accessing (for example, accessing data in a memory) as "determining", "deciding", and the like. In addition, the terms "determining" and "deciding" may include considering resolving, selecting, choosing, establishing, comparing, and the like as "determining" and "deciding". That is, the terms "determining" and "deciding" may include considering some operation as "determining" and "deciding". In addition, "determining (deciding)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Wireless communication system
20 NG-RAN
100 gNB
110 O-DU
111 Communication unit
113 Processing time acquisition unit
115 Parameter control unit
117 Parameter notification unit
120 O-RU
130 Intermediate device (FHM)
130A O-RU
131 Communication unit
133 Processing time notification unit
135 Parameter acquisition unit
137 Parameter setting unit
200 UE
1001 Processor
1002 Memory
1003 Storage
1004 Communication device
1005 Input device
1006 Output device
1007 BUS

The invention claimed is:

1. An open radio access network (O-RAN) distributed unit (O-DU) comprising:
   a receiver which receives, from an intermediate device provided on a fronthaul, processing time information indicating a processing time in the intermediate device;
   a processor which decides capability information for the intermediate device based on the processing time information and on capability information of an O-RAN radio unit (O-RU) provided on the fronthaul; and
   a transmitter which transmits the capability information for the intermediate device to the intermediate device.

2. The O-DU according to claim 1, wherein the processor decides the capability information for the intermediate device based on the processing time information, on the capability information of the O-RU and on a delay time between the intermediate device and the O-DU.

3. The O-DU according to claim 1, wherein the processor decides the capability information for the intermediate device based on the processing time information, on the capability information of the O-RU and on a total delay time in the fronthaul.

4. An intermediate device comprising:
   a transmitter which is provided on a fronthaul and transmits processing time information indicating a processing time in the intermediate device to an open radio access network (O-RAN) distributed unit (O-DU) provided on the fronthaul; and
   a receiver which receives capability information for the intermediate device from the O-DU,
   wherein the O-DU decides the capability information for the intermediate device based on the processing time information and on capability information of an O-RAN radio unit (O-RU) provided on the fronthaul.

5. A radio communication system comprising an intermediate device provided on a fronthaul and an open radio access network (O-RAN) distributed unit (O-DU) provided on the fronthaul, wherein
   the O-DU comprises:
      a receiver which receives, from the intermediate device, processing time information indicating a processing time in the intermediate device;
      a processor which decides capability information for the intermediate device based on the processing time information and on capability information of an O-RAN radio unit (O-RU) provided on the fronthaul; and
      a transmitter which transmits the capability information for the intermediate device to the intermediate device, and
   the intermediate device comprises a receiver which receives the capability information for the intermediate device.

6. A radio communication method comprising:
   receiving by an open radio access network (O-RAN) distributed unit (O-DU), from an intermediate device provided on a fronthaul, processing time information indicating a processing time in the intermediate device;
   deciding by the O-DU, capability information for the intermediate device based on the processing time information and on capability information of an O-RAN radio unit (O-RU) provided on the fronthaul; and transmitting by the O-DU, the capability information for the intermediate device to the intermediate device.

\* \* \* \* \*